United States Patent

[11] 3,626,453

[72] Inventor Trevor J. Riley
 11431 94 "A" Ave., North Surrey, British Columbia, Canada
[21] Appl. No. 15,587
[22] Filed Mar. 2, 1970
[45] Patented Dec. 7, 1971

[54] RILJACK POWER TRANSDUCER
 1 Claim, 3 Drawing Figs.
[52] U.S. Cl. ................................................. 74/193
[51] Int. Cl. ..................................................... F16h 15/16
[50] Field of Search ........................................... 74/191, 193

[56] References Cited
 UNITED STATES PATENTS
 2,461,258 2/1949 Brooks ........................ 74/193
 2,570,493 10/1951 Schmidt ...................... 74/193
 2,612,784 10/1952 Patzak ......................... 74/193
 3,270,145 8/1966 Gauban ........................ 74/193

Primary Examiner—C. J. Husar

ABSTRACT: A motion transmission device for producing variable speed and power and which comprises a cone on a driven shaft and a cone on a driving shaft, the cones having a cylindrical driving wheel therebetween that is slideable between the cones and engaging the cylindrical sides thereof, the position of the intermediate driving wheel determining the relative speed of the cones.

PATENTED DEC 7 1971 3,626,453
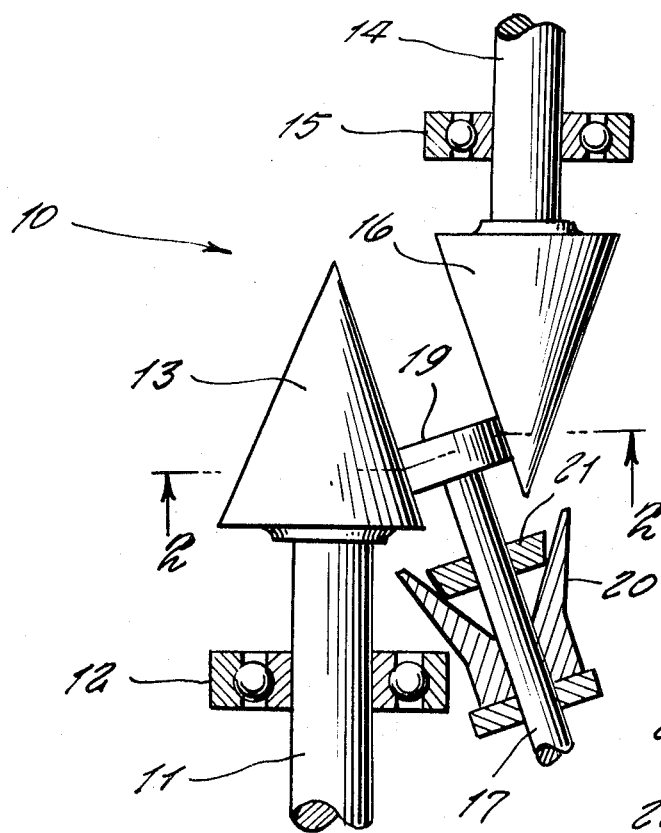
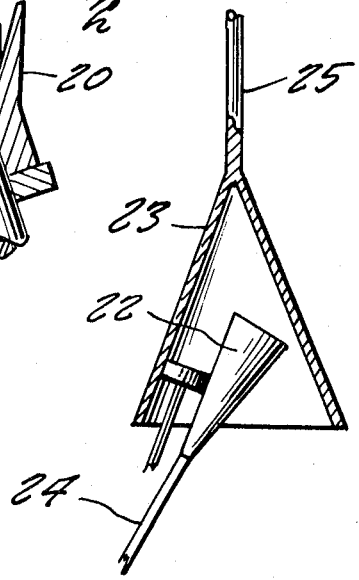
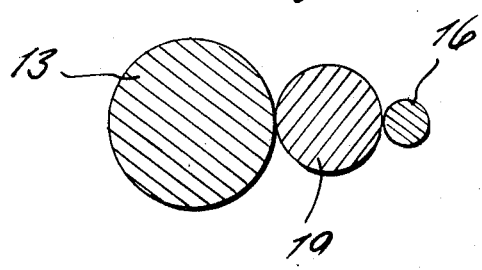
INVENTOR
TREVOR J. RILEY

RILJACK POWER TRANSDUCER

The present invention pertains to motion transmission devices. More specifically the present invention pertains to variable speed transmission devices.

A principal purpose of the present invention is to provide a variable speed transmission device which incorporates a pair of cones one of which is mounted upon a driving shaft and the other of which is mounted upon a driven shaft, the cones being tapered into opposite directions so as to present a parallel cylindrical side respective to each other which is engaged by an intermediate driving wheel slidable along the length of the conical surface so as to provide a variable speed transmitting element.

Another purpose of the present invention is to provide a variable speed transmission device having a positive constant mechanical drive and which adaptable for producing variable power transmission.

Still another purpose of the present invention is to provide a power transducer which may be operated either mechanically, pneumatically, hydraulically or otherwise.

Still another purpose of the present invention is to provide a power transducer incorporating conical surfaces of cones which need not necessarily be located along parallel axes.

Still another purpose of the present invention is to provide a power transducer wherein motion transmission may be transmitted between the outer surfaces of a pair of cones, or wherein motion transmission may be accomplished between an inner conical surface of one cone and an external surface of a second cone.

Other objects of the present invention are to provide a power transducer which is simple in design, inexpensive to manufacture, rugged in construction, easy to use and efficient in operation.

These and other objects will become readily evident upon a study of the following specification and the accompanying drawing wherein:

FIG. 1 is a side elevation view of the present invention shown partly in cross section;

FIG. 2 is a cross-sectional view taken on the line 2—2 of FIG. 1; and

FIG. 3 is a cross-sectional view of a modified form of the present invention wherein transmission is provided between one internal and one external cone, the cones being on a diagonal axis to each other and one cone being of incline different than the other.

Referring now to the drawing in detail, and more particular to FIGS. 1 and 2 of the drawing at time time, the reference numeral 10 represents a power transducer according to the present invention wherein there is a driving shaft 11 supported rotatably free in a bearing 12, the driving shaft 11 supporting a driving cone 13 at one end thereof.

A driven shaft 14 is likewise supported rotatably free in a bearing 15, the driven shaft carrying at one end a driven cone 16.

It is to be noted that the driven shaft 14 and the driving shaft 11 are both located along axes which are parallel to each other but which are not on a common center.

An intermediate shaft 17 is supported in a bearing 18, the intermediate shaft 17 carrying at one end an intermediate driving wheel 19 as shown. The intermediate driving wheel 19 is located between the cones 13 and 16 so that the periphery of the intermediate driving wheel engages both of the cones 13 and 16 at all times. It is to be noted that the conical surfaces of the cones 13 and 16 are in the vicinity of the intermediate driving wheel located parallel to each other so that repositioning of the intermediate driving wheel along any longitudinal position there between permits an engagement of both cones 13 and 16 by the driving wheel 19. The intermediate driving wheel is slideable along the axes of the shaft 17, the intermediate driving wheel accordingly be slidable along the conical faces of the cones 13 and 16. A breaking cone 20 positioned concentrically on the intermediate shaft 17 is positioned within the inner side of a braking cone cup 21, also mounted concentrically upon the intermediate shaft 17.

In operative use, it will now be evident that a change of speed will occur in the motion transmitted to the driven shaft from the driving shaft as the intermediate wheel is changed in position along the length between the cones 13 and 16. For example, as the driving wheel 19 is advanced more closely toward the conical tip of the cone 13, it will at the same time engage a larger diameter portion of the cone 16, thereby slowing down the transmitted speed to the driven shaft 14. Likewise, when the intermediate wheel is advanced towards the base of the cone 13, wherein the diameter is relatively large, the wheel 19 will thus engage the apex portion of the cone 16, thereby making the driven shaft 14 to rotate more rapidly.

In a modified design of the present invention shown in FIG. 3 of the drawing, there is illustrated a transmission provided between one internal cone 22 and an external cone 23, the internal cone 22 being on a shaft 24 while the external cone is on a shaft 25. The cones 22 and 23 are located on diagonal axes to each other and one cone is of a different conical incline than the other cone. The intermediate driving wheel 19 engages the external surface of cone 22 and at the same time engages the inner surface of the cone 23, these surfaces being parallel to each other, as is evident in FIG. 3, and along which accordingly the intermediate driving wheel can be moved so to engage variable diameter portions of the cones.

Thus, it is evident a construction is provided wherein motion is transmitted variably between shafts which are askew relative to each other, and wherein one cone is positioned within the other.

A cone inspection of FIG. 3 will further show that the angle of incline of one cone may be varied respective to the other, and wherein accordingly one cone may be relatively more tapered whereas the other cone is more squat, the present invention allowing a complete diversification there between.

Thus there is provided a power transducer which has a wide application in many power transmissions.

What I now claim is:

1. In a power transducer, the combination of a variable speed transmission device comprised of a driving shaft and a driven shaft, said driving shaft having a driving cone secured thereto, said driven shaft having a driven cone secured thereto, and an intermediate driving wheel between said cones for transmitting motion from said cone to said driven cone, said intermediate driving wheel being axially slideable so to engage different positions of the conical surfaces of said cones so to provide a variable speed transmission, said intermediate driving wheel being mounted on a rotatable intermediate shaft having a breaking cone positioned concentrically therearound, said breaking cone being positioned within the inner side of a breaking cup mounted concentrically upon said intermediate shaft, said driven shaft and said driving shaft being located on axes which are askew to each other, one of said cones comprising a hollow cone having a conical interior sidewall, the other said cone protruding inwardly into said hollow cone with said intermediate driving wheel engaging said conical surface of said cones and said cones each tapering in directions away from each other.

* * * * *